(12) United States Patent
Long et al.

(10) Patent No.: US 9,980,428 B2
(45) Date of Patent: May 29, 2018

(54) MOLDED RIBS FOR AN AGRICULTURAL IMPLEMENT TANK

(71) Applicant: CNH Canada, LTD, Saskatoon (CA)

(72) Inventors: Scott A. Long, Plainfield, IL (US); Martin J. Roberge, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 112 days.

(21) Appl. No.: 13/737,884

(22) Filed: Jan. 9, 2013

(65) Prior Publication Data

US 2014/0190980 A1 Jul. 10, 2014

(51) Int. Cl.
*A01C 15/00* (2006.01)

(52) U.S. Cl.
CPC .................. *A01C 15/006* (2013.01)

(58) Field of Classification Search
CPC ....... A01C 15/005; A01C 15/006; A01C 7/20; A01C 15/02; A01C 7/081; A01C 7/085; A01C 7/18; A01C 7/123
USPC ................ 220/601; 222/143, 608, 609, 462; 206/503, 504
See application file for complete search history.

(56) References Cited

U.S. PATENT DOCUMENTS

| | | | |
|---|---|---|---|
| 2,680,539 A * | 6/1954 | Seltzer | 222/616 |
| 2,941,811 A * | 6/1960 | Sherer | 239/685 |
| 3,425,599 A * | 2/1969 | Everett et al. | 222/609 |
| 3,895,589 A | 7/1975 | Garner et al. | |
| 3,915,343 A | 10/1975 | Barcock | |
| 4,159,064 A * | 6/1979 | Hood | 221/8 |
| 4,444,130 A | 4/1984 | Ray | |
| 4,541,549 A * | 9/1985 | Hadley et al. | 222/143 |
| 4,715,515 A * | 12/1987 | Steilen | 222/143 |
| 4,798,325 A * | 1/1989 | Block | A01M 11/00 239/156 |
| 4,890,757 A * | 1/1990 | Robbins, III | B29C 47/0023 215/12.2 |
| 4,896,615 A * | 1/1990 | Hood et al. | 111/177 |
| 4,930,431 A | 6/1990 | Alexander | |
| 5,294,060 A * | 3/1994 | Thompson | 239/656 |
| 5,623,885 A * | 4/1997 | Haag | 111/200 |
| 5,740,746 A * | 4/1998 | Ledermann et al. | 111/174 |
| 6,148,863 A * | 11/2000 | Memory et al. | 137/899 |
| 6,675,728 B2 | 1/2004 | Lee et al. | |
| 6,772,702 B2 * | 8/2004 | Lee et al. | 111/174 |
| 6,945,481 B2 * | 9/2005 | Thompson | A01C 17/001 239/650 |
| 7,624,692 B2 | 12/2009 | Dryden | |
| 2011/0098851 A1 * | 4/2011 | Glendenning et al. | 700/240 |
| 2012/0227647 A1 * | 9/2012 | Gelinske et al. | 111/174 |

* cited by examiner

Primary Examiner — Ernesto Grano
(74) Attorney, Agent, or Firm — Rebecca L. Henkel; Rickard K. DeMille

(57) ABSTRACT

A seed tank assembly for an agricultural implement including an exhaust opening configured to exhaust seeds from the seed tank assembly. The seed tank assembly further including at least one angled rib molded into the seed tank assembly, in which the at least one angled rib is configured to provide structural rigidity to the seed tank assembly and to direct the seeds toward the exhaust.

14 Claims, 4 Drawing Sheets

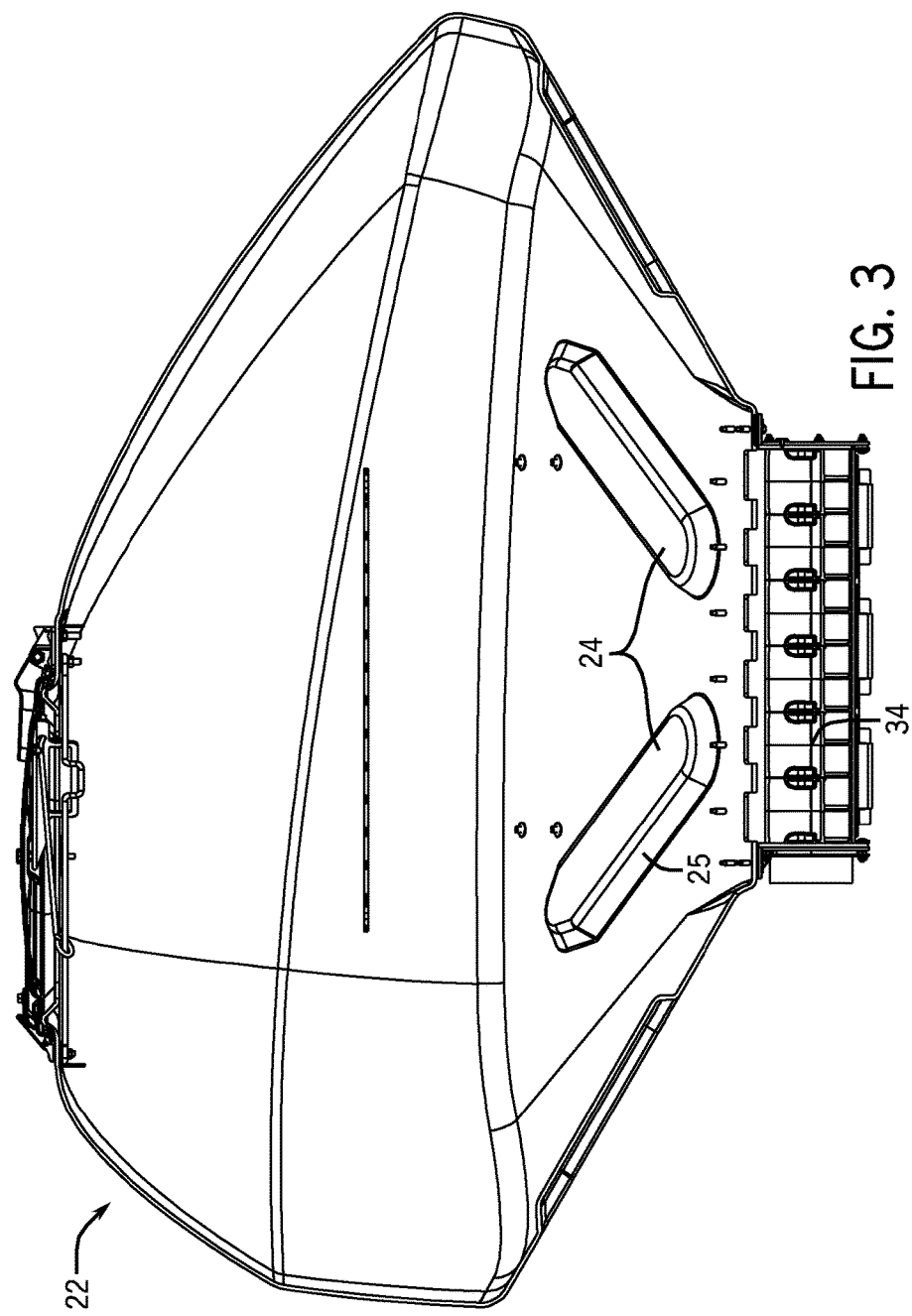

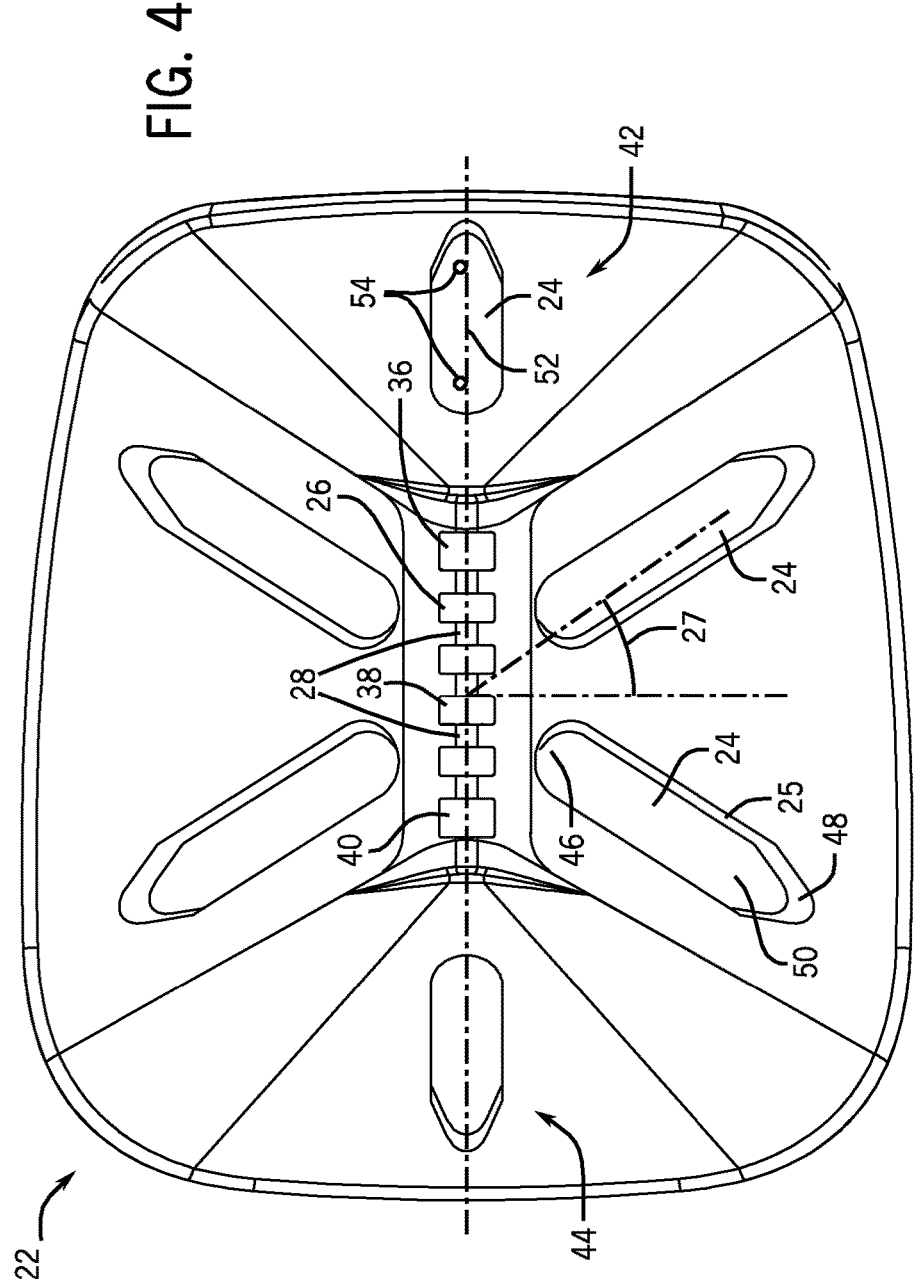

MOLDED RIBS FOR AN AGRICULTURAL IMPLEMENT TANK

BACKGROUND

The invention relates generally to ground working equipment, such as agricultural equipment, and more specifically, to seed tanks for a planting implement.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Certain planting implements include a central seed tank and a pneumatic distribution system configured to convey seeds from the tank to each row unit. For example, the pneumatic distribution system may include an inductor box positioned beneath the seed tank. The inductor box is configured to receive seeds from the tank, to fluidize the seeds into an air/seed mixture, and to distribute the air/seed mixture to the row units via a network of pneumatic hoses/conduits. Each row unit, in turn, receives the seeds from the pneumatic hoses/conduits, and directs the seeds to a metering system. The metering system is configured to provide a flow of seeds to a seed tube for deposition into the soil. By operating the metering system at a particular speed, a desired seed spacing may be established as the implement traverses a field.

The central seed tank may exhaust the seeds from the tank to the inductor box through an exhaust opening. During planting operations, the pressure of the seeds within the tank may induce the seeds to be exhausted uniformly across the exhaust opening. Unfortunately, as the volume of the seeds within the tank is reduced, the pressure of the seeds may be insufficient to maintain the uniform distribution. As a result, a large amount of seeds may remain in the seed tank after the seed flow to certain units is terminated, thereby reducing efficiency of planting operations.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a seed tank assembly for an agricultural implement includes an exhaust opening configured to exhaust seeds from the seed tank assembly. The seed tank assembly further includes at least one angled rib molded into the seed tank assembly, in which the at least one angled rib is configured to provide structural rigidity to the seed tank assembly and to direct the seeds toward the exhaust.

In a second embodiment, a seed tank assembly for an agricultural implement includes an exhaust opening configured to exhaust seeds from the seed tank assembly, in which the exhaust opening includes a first longitudinal end, a second longitudinal end. The seed tank assembly further includes at least one rib molded into the seed tank assembly, in which the at least one rib is configured to provide structural rigidity to the seed tank assembly and to direct the seeds toward the exhaust opening. The at least one rib is configured to enhance uniformity of seed distribution along the exhaust opening from the first longitudinal end to the second longitudinal end.

In a third embodiment, a seed tank assembly for an agricultural implement includes an exhaust opening configured to exhaust seeds from the seed tank assembly, in which at least one web extends across the exhaust opening forming a plurality of apertures. The seed tank assembly further includes at least one rib molded into the seed tank assembly, in which the at least one rib is configured to provide structural rigidity to the seed tank assembly and to direct the seeds toward aperture. The at least one rib is configured to enhance uniformity of seed distribution to the plurality of apertures.

DRAWINGS

These and other features, aspects, and advantages of the present invention will become better understood when the following detailed description is read with reference to the accompanying drawings in which like characters represent like parts throughout the drawings, wherein:

FIG. 3 is a side view of a seed tank of FIG. 2, showing the seed tank interfacing with an inductor box.

FIG. 4 is a top cross-sectional view of the seed tank FIG. 2, showing angled ribs molded into the seed tank and an exhaust opening.

DETAILED DESCRIPTION

Figure 1:
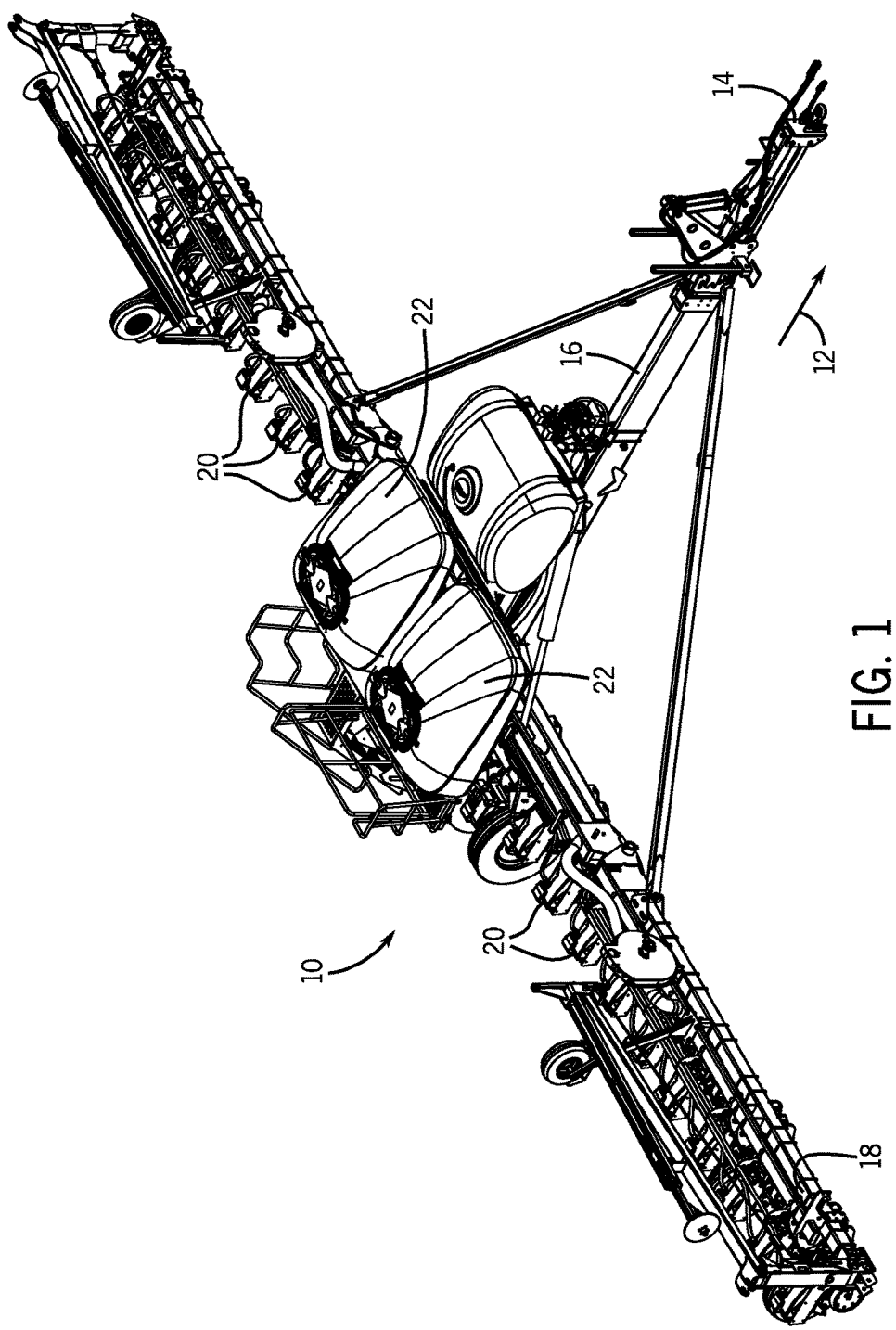
FIG. 1 is a perspective view of an embodiment of an agricultural implement configured to deposit seeds into a soil surface.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Various embodiments of the present disclosure include a central seed tank for a planting implement. The seed tank may be used to supply a planting implement with 24 rows, for example. Thus, the seed tank may be of substantial size (e.g., about 3 feet tall and 6 feet across or about 1 meter tall and 2 meters across, and hold approximately 3.5 tons of seeds). The seed tank may include an exhaust opening configured to exhaust the seeds from the seed tank. As the seeds are exhausted, the pressure of the seeds within the tank may cause the seeds to be exhausted uniformly across the exhaust opening. However, as the seeds are exhausted, the pressure of the seeds may be insufficient to maintain the uniform flow. A large amount of seeds (e.g. 50-60 pounds or about 20-30 kg) may be left in the seed tank after the uniform flow of seeds ceases. Thus, the efficiency of the planting implement may be reduced.

Accordingly, one disclosed embodiment provides a seed tank assembly configured to store seeds for an agricultural implement. The seed tank assembly includes an exhaust opening configured to exhaust seeds from the seed tank assembly, and at least one angled rib molded into the seed tank body and configured to provide structural rigidity to the seed tank. The angled rib also directs the seeds toward the exhaust opening to facilitate substantially uniform distribution of the seeds into the exhaust opening. In other words, angled ribs may control the natural flow of the seeds by directing more seeds to the middle portion of the exhaust opening, for example. Thus, when the middle portion of the exhaust opening no longer receives seeds, the seeds remaining in the seed tank may be substantially less than seeds remain in a tank without the ribs (e.g. about 5-6 pounds or about 2-3 kg). In addition, the ribs provide a steady uniform flow of seeds across the exhaust opening.

FIG. 1 is a perspective view of an embodiment of an agricultural implement configured to deposit seeds into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit seeds at a desired depth beneath the soil surface, thereby establishing rows of planted seeds. The implement 10 also includes seed tanks 22, and a pneumatic distribution system configured to convey seeds from the tanks to the row units 20. In certain embodiments, the pneumatic distribution system includes an inductor box positioned beneath each seed tank 22. Each inductor box is configured to receive seeds from a respective tank, to fluidize the seeds into an air/seed mixture, and to distribute the air/seed mixture to the row units 20 via a network of pneumatic hoses/conduits.

In certain embodiments, each row unit 20 includes a residue manager, an opening assembly, a seed tube, closing discs, and a press wheel. The residue manager includes a rotating wheel having multiple tillage points or fingers that break up crop residue, thereby preparing the soil for seed deposition. The opening assembly includes a gauge wheel and an opener disc. The gauge wheel may be positioned a vertical distance above the opener disc to establish a desired trench depth for seed deposition into the soil. As the row unit travels across a field, the opener disc excavates a trench into the soil for seed deposition. The seed tube, which may be positioned behind the opening assembly, directs a seed from a metering system into the excavated trench. The closing discs then direct the excavated soil into the trench to cover the planted seed. Finally, the press wheel packs the soil on top of the seed with a desired pressure.

While the illustrated implement 10 includes 24 row units 20, it should be appreciated that alternative implements may include more or fewer row units 20. For example, certain implements 10 may include 6, 8, 12, 16, 24, 32, or 36 row units, or more. In addition, the spacing between row units may be particularly selected based on the type of crop being planting. For example, the row units may be spaced 30 inches from one another for planting corn, and 15 inches from one another for planting soy beans.

Figure 2:
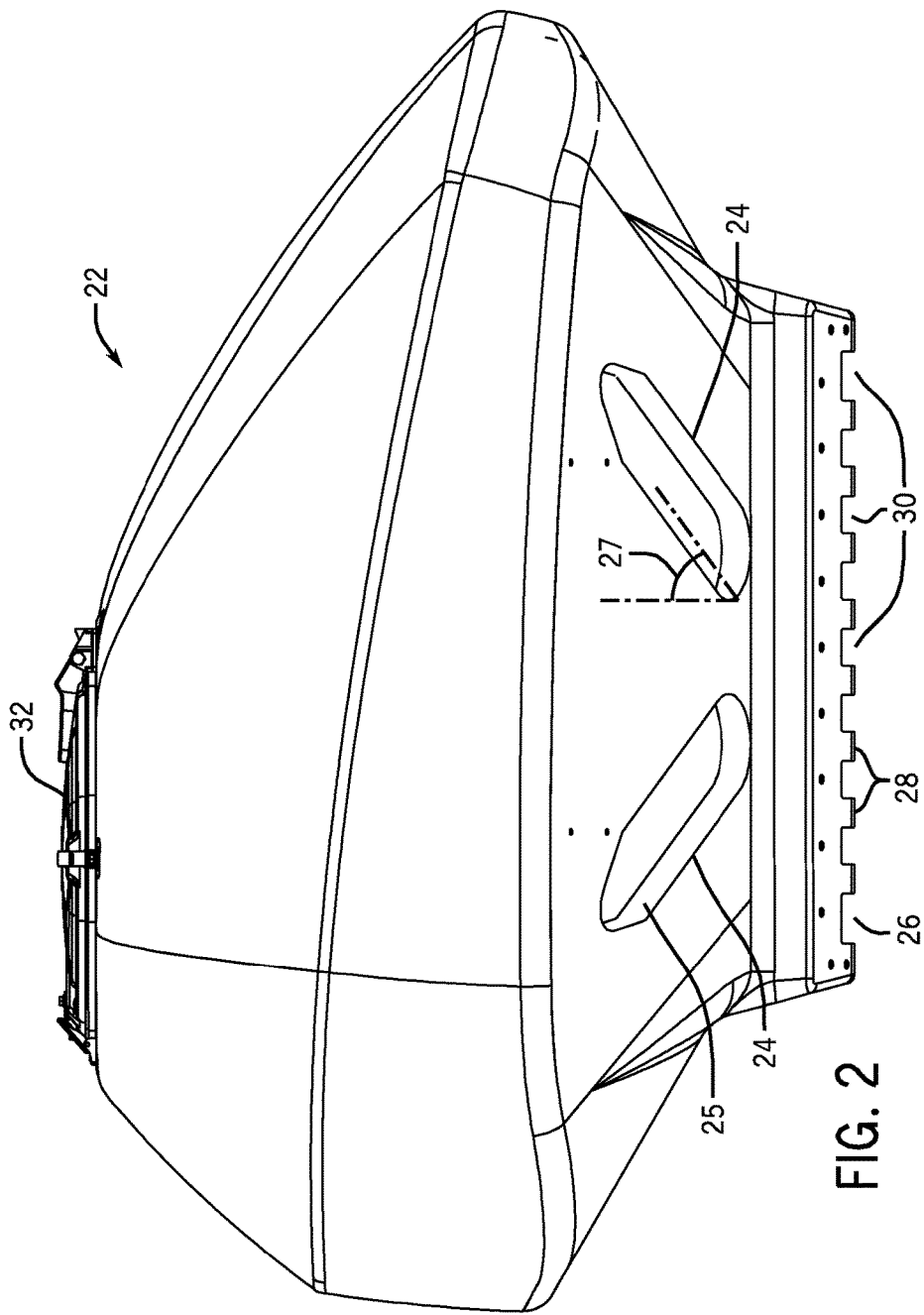
FIG. 2 is a side view of an embodiment of a seed tank having ribs molded into the seed tank.

FIG. 2 is a side view of an embodiment of the seed tank of FIG. 1, showing ribs 24 molded into the seed tank 22. The seed tank 22 includes ribs 24, an exhaust opening 26, and webbing 28. The ribs 24 may be configured to provide structural rigidity to the seed tank 22 and to direct the seeds toward the exhaust opening 26 to facilitate uniform distribution of the seeds into the exhaust opening 26. As described above, the seed tank 22 may be configured to store seeds before distribution to the row units 20. In certain embodiments, the seed tank 22 may be about 3 feet tall, 6 feet wide, and molded from a single piece of polyethylene, which is a resilient material. With such a large tank molded from a polymeric material, the seed tank 22 may be difficult to handle and to maneuver due to the flexibility of the seed tank 22. Accordingly, in the depicted embodiment, the ribs 24 are molded into the seed tank 22 to provide structural rigidity to the seed tank 24. Thus, the flexibility of the seed tank 24 may be substantially reduced. In addition, in the depicted embodiment, the ribs 24 are angled toward one another at an angle 27 relative to an axis substantially perpendicular to the exhaust opening. For example, the angle 27 may be about 30 degrees from perpendicular to the exhaust opening. The angle may be any suitable angle greater than 10 degrees, such as between 10-20 degrees, 20-30 degrees, 30-40 degrees, 40-50 degrees, or 50-60 degrees. The depicted embodiment also includes a seed tank lid 32 for selectively covering an opening in the seed tank 22.

The exhaust opening 26 is configured to exhaust seeds from the seed tank 22. It should be appreciated that the exhaust opening 26 may be located at any suitable location on the seed tank 22 that enables seeds to be exhausted from the seed tank 22. As described above, the seeds may pass from the tank to the pneumatic distribution system for distribution to the row units 20. Furthermore, in the depicted embodiment, the exhaust opening 26 is substantially rectangular. The rectangular shape may facilitate interfacing with the pneumatic distribution system, and in some embodiments, the inductor box. In addition, in the depicted embodiment, the rectangular exhaust opening 26 extends partially along the length of the seed tank 22. Thus, it should be appreciated that the rectangular exhaust opening 26 may trend away from a single point flow because, unlike a funnel, the seeds may flow through multiple points of the exhaust opening 26. The depicted embodiment further includes webbing 28 that runs across the exhaust opening 26. The webbing 28 is configured to divide the exhaust opening into multiple smaller openings 30

FIG. 3 is a side view of the seed tank of FIG. 2, showing the seed tank 22 interfacing with an inductor box 34. As described above, the inductor box 34 may be included in the pneumatic distribution system. As depicted, the inductor box 34 extends along the exhaust opening 26. The long rectangular inductor box 34 may be configured to efficiently distribute seeds to a larger number of row units. It should be appreciated that the inductor box 34 and the seed tank 22 may be the same length in certain embodiments. However, in the depicted embodiment the seed tank 22 is longer than the inductor box 34.

As described above, the seed tank 22 may be configured to contain 3.5 tons of seeds. In addition, the pneumatic distribution system, specifically the inductor box 34, may circulate air into the seed tank 22. Thus, the seed tank 22 may support both the weight of the seeds, as well as the pressure of the circulating air. Similar to the structural rigidity described above, the rib walls 25 may be configured to reduce flex of the seed tank. It should be appreciated, however, that some flex in the seed tank 22 may remain. In addition, the inductor box 34 may be configured to function efficiently. Thus, it may be beneficial for the seed tank 22 to uniformly provide seeds across the length of the exhaust opening 30 as the seed tank 22 empties, thereby reducing the frequency of refilling the tank. Accordingly, as discussed in detail below, the ribs 24 direct seed toward the exhaust opening 26, thereby enhancing the uniformity of the seed distribution into the exhaust opening 26.

FIG. 4 is a top cross-sectional view of the seed tank of FIG. 2, showing angled ribs molded into the seed tank 22 and the exhaust opening 26. In the depicted embodiment, the exhaust opening 26 is divided into smaller apertures (e.g. 36, 38, and 40) by the webbing 28. As depicted, aperture 36 is the first aperture, aperture 38 is a middle aperture, and aperture 40 is the last aperture on the seed tank 22. It should be appreciated that other embodiments of the seed tank 22 do not have the webbing to divide the exhaust opening 26 into smaller apertures. In the present embodiment, flow through the apertures 36, 38, and 40 may be indicative of the flow through the front, middle, and back of the exhaust opening 26, respectively.

As described above, the depicted seed tank 22 may trend away from a single point flow because of the rectangular exhaust opening 26. In other words, the middle aperture (aperture 38) may exhaust its seeds supply before the sides of the exhaust aperture (apertures 36 and 40). It should be appreciated that each part of the exhaust opening 26 drains its surrounding area. However, as in the depicted embodiment, when the exhaust opening 26 extends partially along the length of the seed tank 22, there may be areas (e.g. front 42 and back 44) of the seed tank 22 where the exhaust opening 26 is not directly beneath. Thus, the seeds in the front 42 may be exhausted through opening 36 and the seeds in the back 44 may be exhausted through aperture 40, which may result in apertures 36 and 40 exhausting seeds from a larger area than the middle aperture 38.

Accordingly, the ribs 24 are configured to direct the seeds toward the central portion of the seed tank 22. As a result, the seed tank 22 may be emptied in a substantially uniform manner, such that a flow of seeds through each of the smaller apertures (i.e. 36, 38, and 40) is substantially the same. As described above, the ribs 24 may be molded into the seed tank 22 at an angle 27. In the depicted embodiment, the angle 27 may be about 30 degrees from an axis substantially perpendicular to the exhaust opening 26. The angle 27 of the ribs 24 may facilitate controlling the flow of the seeds in the seed tank 22. Specifically, in the depicted embodiment, the ribs 24 may direct approximately the middle third of the seeds in the tank toward the middle of the exhaust opening 26. In other words, the ribs 24 may direct seeds that would naturally drain toward aperture 36 and aperture 40 toward aperture 38 in the middle of the tank. Thus, the flow of seeds across the exhaust opening 26 may be more balanced and uniform through the front, middle, and back. It should be appreciated, that other angles, such as 45 degrees from an axis substantially perpendicular to the exhaust opening 26 may also be used to substantially uniformly drain the seed tank 22. As described above, any suitable angle greater than 10 degrees may be used, such as between 10-20 degrees, 20-30 degrees, 30-40 degrees, 40-50 degrees, or 50-60 degrees.

In order to effectively direct the flow of seeds, the ribs 24 may extend inwardly from the seed tank 22 about 2-3 inches or about 5-8 cm. In other words, the height of the ribs may be about 2-3 inches or about 5-8 cm. In addition, to assist in enhancing seed distribution uniformity, the ribs 24 are configured to reduce the amount of seeds trapped by the ribs 24. For example, the rib walls 25 may be slanted. The slanted rib walls 25 enable the seeds to slide around the ribs 25 (e.g. by reducing sharp angles that may otherwise trap seeds). Similarly, the tail 46 of each rib 24 may be circular. A circular shape may facilitate directing the flow of seeds without creating a ledge that may trap seeds. In addition, the tip 48 of the rib may be triangular. The point of the tip 48 may facilitate separating the flow toward the side ports and the flow toward the middle ports. In the depicted embodiment, the surface 50 of the ribs 24 is flat to reduce the possibility of the seeds getting trapped in the ribs 24. The depicted configuration of the ribs 24 reduces sharp angles that may otherwise trap seeds. It should be appreciated that other configurations, such as a rounded surface, may also be used to reduce the amount of seeds trapped by the ribs 24.

The depicted embodiment also includes a front rib 52. Similar to the ribs 24 described above, the front rib 52 may be configured to direct seeds and provide structural support. In addition, the front rib 52 also includes sensors 54, which are configured to monitor the level of the seeds in the seed tank 22. The techniques herein may enable the sensors 54 to give a more accurate reading of the seed level because the seed tank 22 empties in a substantially uniform manner. Comparatively, if the seed tank 22 does not uniformly empty, an operator may mistakenly believe the seed tank 22 contains sufficient seeds when in fact it is not.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A seed tank assembly for an agricultural implement comprising:
    an exhaust opening that extends partially along a longitudinal extent of the seed tank assembly such that a longitudinal extent of the exhaust opening is substantially parallel to the longitudinal extent of the seed tank assembly, wherein the exhaust opening is configured to exhaust seeds from the seed tank assembly; and
    a first angled rib molded into a wall of the seed tank assembly at a first angle relative to a first plane perpendicular to the longitudinal extent of the exhaust opening and at a second angle relative to a second plane perpendicular to a lateral extent of the exhaust opening, wherein:
        the first angle is between 10 degrees and 60 degrees;
        the second angle is between 30 degrees and 80 degrees;
        the first angled rib is configured to:

provide structural rigidity to the seed tank assembly; and redirect first seed in the seed tank assembly from a first flow path toward a first portion of the exhaust opening to a second flow path toward a second portion of the exhaust opening, different from the first portion of the exhaust opening; and the first angled rib comprises:
a tapered end at a first distal end of the first angled rib, wherein the a tapered end is configured to facilitate separating the first seed from second seed directly adjacent the first seed in the first flow path; and
a rounded end at a second distal end opposite the first distal end.

2. The seed tank assembly of claim 1, wherein:
the first angle is between 10 degrees and 20 degrees relative to the first plane and the second angle is between 70 degrees and 80 degrees relative to the second plane;
the first angle is between 20 degrees and 30 degrees relative to the first plane and the second angle is between 60 degrees and 70 degrees relative to the second plane;
the first angle is between 30 degrees and 40 degrees relative to the first plane and the second angle is between 50 degrees and 60 degrees relative to the second plane;
the first angle is between 40 degrees and 50 degrees relative to the first plane and the second angle is between 40 degrees and 50 degrees relative to the second plane; or
the first angle is between 50 degrees and 60 degrees relative to the first plane and the second angle is between 30 degrees and 40 degrees relative to the second plane.

3. The seed tank assembly of claim 1, wherein:
the first portion of the exhaust opening corresponds to a distal portion of the exhaust opening; and
the second portion of the exhaust opening corresponds to a middle portion of the exhaust opening.

4. The seed tank assembly of claim 1, wherein:
the first portion of the exhaust opening comprises a first aperture of the exhaust opening; and
the second portion of the exhaust opening comprises a second aperture of the exhaust opening.

5. The seed tank assembly of claim 1, wherein the second angle is a complement of the first angle.

6. A seed tank assembly for an agricultural implement comprising:
an exhaust opening that extends partially along a longitudinal extent of the seed tank assembly such that a longitudinal extent of the exhaust opening is substantially parallel to the longitudinal extent of the seed tank assembly, wherein the exhaust opening is configured to exhaust seeds from the seed tank assembly, and the exhaust opening comprises a distal longitudinal portion and a central longitudinal portion, different than the distal longitudinal portion; and
a first rib molded into a wall of the seed tank assembly at a first angle relative to a first plane perpendicular to the longitudinal extent of the exhaust opening and at a second angle relative to a second plane perpendicular to a lateral extent of the exhaust opening, wherein:
the first angle is between 10 degrees and 60 degrees;
the second angle is between 30 and 80 degrees;
the first rib is configured to:

provide structural rigidity to the seed tank assembly; and redirect a portion of the seeds in the seed tank assembly from a first flow path to a second flow path to enhance uniformity of seed distribution between the distal longitudinal portion of the exhaust opening and the central longitudinal portion of the exhaust opening; and the first rib comprises:
a tapered end at a first distal end of the first rib, wherein the tapered end is configured to facilitate separating the second flow path from the first flow path; and
a rounded end at a second distal end opposite the first distal end.

7. The seed tank assembly of claim 6, wherein:
the first angle is between 10 degrees and 20 degrees relative to the first plane and the second angle is between 70 degrees and 80 degrees relative to the second plane;
the first angle is between 20 degrees and 30 degrees relative to the first plane and the second angle is between 60 degrees and 70 degrees relative to the second plane;
the first angle is between 30 degrees and 40 degrees relative to the first plane and the second angle is between 50 degrees and 60 degrees relative to the second plane;
the first angle is between 40 degrees and 50 degrees relative to the first plane and the second angle is between 40 degrees and 50 degrees relative to the second plane; or
the first angle is between 50 degrees and 60 degrees relative to the first plane and the second angle is between 30 degrees and 40 degrees relative to the second plane.

8. The seed tank assembly of claim 6, wherein the exhaust opening is substantially rectangular and comprises a plurality of substantially rectangular apertures.

9. The seed tank assembly of claim 6, wherein:
the first flow path is toward the distal longitudinal portion of the exhaust opening; and
the second flow path is toward the central longitudinal portion of the exhaust opening.

10. The seed tank assembly of claim 6, wherein the second angle is a complement of the first angle.

11. A seed tank assembly for an agricultural implement comprising:
an exhaust opening that extends partially along a longitudinal extent of the seed tank assembly such that a longitudinal extent of the exhaust opening is substantially parallel to the longitudinal extent of the seed tank assembly, wherein the exhaust opening is configured to exhaust seeds from the seed tank assembly, wherein at least one web extends across the exhaust opening forming a plurality of apertures; and
a first rib molded into a wall of the seed tank assembly at a first angle relative to a first plane perpendicular to the longitudinal extent of the exhaust opening and at a second angle relative to a second plane perpendicular to a lateral extent of the exhaust opening, wherein:
the first angle is between 10 degrees and 60 degrees;
the second angle is between 30 degrees and 80 degrees;
the first rib is configured to:
provide structural rigidity to the seed tank assembly; and redirect a portion of the seeds in the seed tank assembly from a first flow path toward a first aperture of the plurality of apertures to a second flow path toward a second aperture of the plurality of apertures to enhance uniformity of seed distribution between the first aperture and the second aperture; and the first rib comprises:
    a tapered end at a first distal end of the first rib, wherein the tapered end is configured to facilitate separating the second flow path from the first flow path; and
    a rounded end at a second distal end opposite the first distal end.

12. The seed tank assembly of claim 11, wherein:
the first angle is between 10 degrees and 20 degrees relative to the first plane and the second angle is between 70 degrees and 80 degrees relative to the second plane;
the first angle is between 20 degrees and 30 degrees relative to the first plane and the second angle is between 60 degrees and 70 degrees relative to the second plane;
the first angle is between 30 degrees and 40 degrees relative to the first plane and the second angle is between 50 degrees and 60 degrees relative to the second plane;
the first angle is between 40 degrees and 50 degrees relative to the first plane and the second angle is between 40 degrees and 50 degrees relative to the second plane; or
the first angle is between 50 degrees and 60 degrees relative to the first plane and the second angle is between 30 degrees and 40 degrees relative to the second plane.

13. The seed tank assembly of claim 11, wherein:
the first aperture is located at a distal end of the exhaust opening; and
the second aperture is located in a central portion of the exhaust opening.

14. The seed tank assembly of claim 13, wherein:
each of the plurality of apertures is substantially rectangular; and
a longitudinal extent of each of the plurality of apertures is parallel to the second plane.

\* \* \* \* \*